United States Patent
Tseng

(10) Patent No.: US 10,434,744 B2
(45) Date of Patent: Oct. 8, 2019

(54) COMPOSITE FIBER, COMPOSITE BOARD, AND METHOD FOR MANUFACTURING THE COMPOSITE BOARD

(71) Applicant: Kai-Hsi Tseng, Xianxi Township, Changhua County (TW)

(72) Inventor: Kai-Hsi Tseng, Xianxi Township, Changhua County (TW)

(*) Notice: Subject to any disclaimer, the term of this patent is extended or adjusted under 35 U.S.C. 154(b) by 0 days.

(21) Appl. No.: 15/730,984

(22) Filed: Oct. 12, 2017

(65) Prior Publication Data
US 2019/0111656 A1    Apr. 18, 2019

(51) Int. Cl.
| | |
|---|---|
| *B29C 70/20* | (2006.01) |
| *B32B 5/12* | (2006.01) |
| *D01F 8/04* | (2006.01) |
| *B32B 5/08* | (2006.01) |
| *D01D 5/34* | (2006.01) |
| *D01F 8/06* | (2006.01) |

(52) U.S. Cl.
CPC ............. *B32B 5/12* (2013.01); *B32B 5/08* (2013.01); *D01D 5/34* (2013.01); *D01F 8/04* (2013.01); *D01F 8/06* (2013.01); *B32B 2262/0253* (2013.01); *B32B 2571/00* (2013.01); *D10B 2321/021* (2013.01); *D10B 2321/022* (2013.01); *D10B 2501/04* (2013.01)

(58) Field of Classification Search
CPC ..... B29C 48/16; B29C 70/386; B29C 70/382; B29C 70/20; D01F 8/04
See application file for complete search history.

(56) References Cited

U.S. PATENT DOCUMENTS

| | | | | | |
|---|---|---|---|---|---|
| 4,501,856 | A | * | 2/1985 | Harpell | C08J 5/04 264/257 |
| 4,563,392 | A | * | 1/1986 | Harpell | D06M 15/227 428/373 |
| 4,737,527 | A | * | 4/1988 | Maranci | C08G 59/52 523/205 |
| 4,748,064 | A | * | 5/1988 | Harpell | B32B 5/28 428/113 |
| 5,094,883 | A | * | 3/1992 | Muzzy | B29C 70/50 264/131 |
| 5,627,226 | A | * | 5/1997 | Lustiger | C08K 5/3437 524/579 |
| 5,756,206 | A | * | 5/1998 | Davies | D06M 23/08 428/367 |
| 6,824,863 | B1 | * | 11/2004 | Kitayama | C08J 5/046 428/292.1 |

OTHER PUBLICATIONS

Cabrera, N. O., Recyclable all-polypropylene composites : concept, properties and manufacturing, Eindhoven: Technische Universiteit Eindhoven (2004), 188 pages. (Year: 2004).*

* cited by examiner

*Primary Examiner* — Matthew J Daniels
(74) *Attorney, Agent, or Firm* — Sinorica, LLC

(57) ABSTRACT

Provided are a composite fiber, a composite board and a method for manufacturing the composite board. The composite fiber is composed of a core and a shell formed around the core, a melting temperature of the shell is lower than a melting temperature of the core, and the strength of the shell is higher than the strength of the core. The composite fiber can be manufactured into a composite board with high impact strength, high moldability, low ductility, light weight and high heat resistance, and thereby meeting protection requirements.

4 Claims, 3 Drawing Sheets

COMPOSITE FIBER, COMPOSITE BOARD, AND METHOD FOR MANUFACTURING THE COMPOSITE BOARD

BACKGROUND OF THE INVENTION

1. Field of the Invention

The present invention relates to a composite fiber, a composite board and a method for manufacturing the composite board.

2. Description of the Prior Arts

Since injuries often occur in sports training or competitions, the prior arts provide a variety of protection products, such as knee pads, ankle pads and elbow pads, for people to choose. Among them, the conventional protection products are made of a single material (e.g., polypropylene fiber) through weaving and molding processes. However, the conventional protection products are made from a single-component fiber, and the strength of the protection products is limited and thus cannot provide good protection.

SUMMARY OF THE INVENTION

To overcome the shortcomings, the present invention provides a composite fiber that can be simply manufactured into a composite board with good impact strength, thereby meeting the protection requirement.

To achieve the foresaid objective, the present invention provides a composite fiber composed of a core and a shell formed around the core. A melting temperature of the shell is lower than a melting temperature of the core, and the strength of the shell is higher than the strength of the core.

Based on the above technical means, the composite fiber is heated at the temperature between the melting temperature of the shell and the melting temperature of the core. Then the composite fiber can be manufactured into a composite board with good impact strength, high moldability, low ductility, light weight and high heat resistance.

The core is made of polypropylene copolymers or polypropylene homopolymers, and the shell is made of polyethylene copolymers, polyethylene homopolymers, polypropylene copolymers or polypropylene homopolymers.

The melting temperature of the core is between 160° C. and 180° C. and the melting temperature of the shell is between 120° C. and 140° C.

To overcome the shortcomings, another objective of the present invention is to provide a composite board with good impact strength.

For this reason, the present invention provides a composite board made of the foresaid composite fibers, and the composite board comprises multiple substrates and multiple composite layers. The composite layers are arranged alternatey with the substrates, each composite layer is composed of multiple cores and a coating body coating the cores, and the coating body is attached to the adjacent substrate.

The composite layer is made of the shell and the core.

Besides, another objective of the present invention is to provide a method for manufacturing the composite board.

For this reason, the present invention provides a method for manufacturing the composite board. The method comprises: stretching multiple composite fibers and melting the shells of the composite fibers to obtain the composite board.

Based on the above technical means, the manufacturing method can effectively manufacture a composite board with good structural strength and resistance to the external force.

Other objectives, advantages and novel features of the invention will become more apparent from the following detailed description when taken in conjunction with the accompanying drawings, rather than limiting the scope of the invention.

DETAILED DESCRIPTION OF THE PREFERRED EMBODIMENTS

In order to illustrate the technical means adopted by the present invention to achieve the objective, the preferred embodiments of the present invention will be further described in detail below with reference to the drawings.

Figure 1:
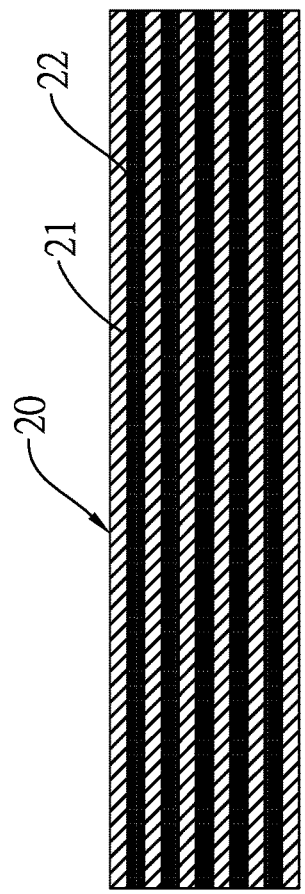
FIG. 1 is a flow chart of manufacturing a composite board by composite fibers of the present invention.
Figure 1:
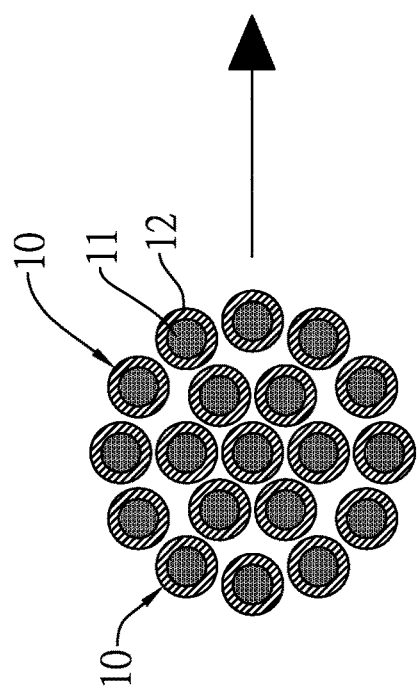

As illustrated in FIG. 1, a composite fiber 10 of the present invention is composed of a core 11 and a shell 12. The core 11 is a round bar and the shell 12 is formed around the core 11. A melting temperature of the shell 12 is lower than a melting temperature of the core 11, and the strength of the shell 12 is higher than the strength of the core 11. The shell 12 of each composite fiber 10 is attached to the shell 12 of an adjacent composite fiber 10. In addition, each composite fiber 10 is substantially a round bar.

In a preferred embodiment, the core 11 is made of polypropylene copolymers or polypropylene homopolymers, while the shell 12 is made of polyethylene copolymers, polyethylene homopolymers, polypropylene copolymers or polypropylene homopolymers. More specifically, the melting temperature of the polyethylene copolymer, polyethylene homopolymer, polypropylene copolymer, and polypropylene homopolymer for the shell 12 is lower than the melting temperature of the polypropylene copolymer and polypropylene homopolymer for the core 11. In other words, the polyethylene copolymer, polyethylene homopolymer, polypropylene copolymer and polypropylene homopolymer for the shell 12 are low-melting point polyethylene copolymer, low-melting point polyethylene homopolymer, low-melting point polypropylene copolymer and low-melting point polypropylene homopolymer respectively, while the polypropylene copolymer and polypropylene homopolymer for the core 11 are high-melting point polypropylene copolymer and high-melting point polypropylene homopolymer respectively.

In a preferred embodiment, the melting temperature of the core 11 is between 160° C. and 180° C. and the melting temperature of the shell 12 is between 120° C. and 140° C.

Figure 2:
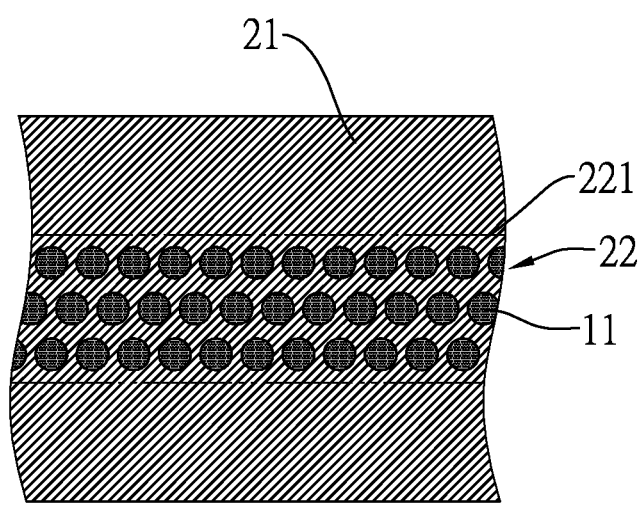
FIG. 2 is a partially enlarged view of a composite board of the present invention.
Figure 3:
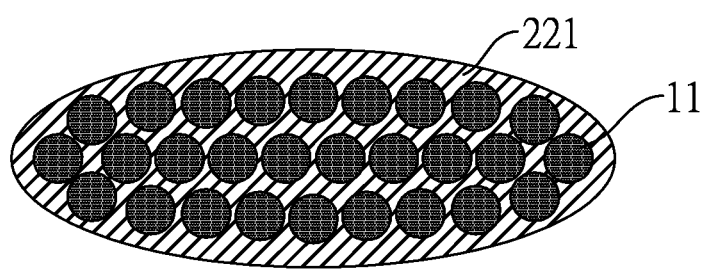
FIG. 3 is a partially enlarged view of the composite layer in the composite board of the present invention.

As illustrated in FIG. 1 to FIG. 3, multiple composite fibers 10 can be stretched into a composite board 20 of the present invention under high temperature and high pressure. The composite board 20 contains multiple substrates 21 and multiple composite layers 22 arranged alternately with the substrate 21, each composite layer 22 is composed of multiple cores 11 and a coating body 221 coating the cores 11, and the coating body 221 is attached to the adjacent substrate 21. The composite layer contains the shell 12 and the core 11, and the shell 12 is melted and then solidified into the coating body 221 at the temperature between the melting temperature of the shell 12 and the melting temperature of the core 11.

Since the melting temperature of the shell 12 of the composite fiber 10 is lower than the melting temperature of the core 11, the composite fiber 10 can be directly heated to melt the shell 12 but not to melt the core 11, thereby obtaining the composite board 20. The shape of the composite board 20 can be custom-made to be both fitted and comfortable based on needs. Since the core 11 is not melted, the composite board 20 made from the composite fiber 10 can have improved overall structural strength and good impact resistance. In addition, compared with a board made from single-component polypropylene fibers, the composite board 20 of the present invention has the advantages of good impact strength, high moldability, as well as low ductility, light weight, high heat resistance, and so on.

Therefore, the composite fiber 10 of the present invention has an advantage that can be manufactured into a composite board 20 with good impact strength, high moldability, low ductility, light weight and high heat resistance.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for manufacturing a composite board comprising the steps of:
    stretching multiple composite fibers, wherein the composite fibers are each composed of a core and a shell formed around the core; and
    melting the shells of the composite fibers to obtain a composite board, wherein a melting temperature of the shells is lower than a melting temperature of the cores, and the strength of the shells is higher than the strength of the cores.

2. The method as claimed in claim 1, wherein the cores are made of polypropylene copolymers or polypropylene homopolymers, and the shells are made of polyethylene copolymers, polyethylene homopolymers, polypropylene copolymers or polypropylene homopolymers.

3. The method as claimed in claim 2, wherein the melting temperature of the cores is between 160° C. and 180° C. and the melting temperature of the shells is between 120° C. and 140° C.

4. The method as claimed in claim 1, wherein the melting temperature of the cores is between 160° C. and 180° C. and the melting temperature of the shells is between 120° C. and 140° C.

* * * * *